United States Patent
Luo et al.

(10) Patent No.: US 8,386,535 B2
(45) Date of Patent: Feb. 26, 2013

(54) FORM PROCESSING CLOUD SERVICE WITH TEMPLATE REPOSITORY

(75) Inventors: Guiluan Luo, Dubln, CA (US); Zhenyu Lu, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/194,144

(22) Filed: Jul. 29, 2011

(65) Prior Publication Data

US 2013/0031145 A1   Jan. 31, 2013

(51) Int. Cl.
*G06F 17/30* (2006.01)
*G06F 7/00* (2006.01)
*G06K 9/00* (2006.01)

(52) U.S. Cl. ........ 707/812; 382/173; 382/181; 715/200; 715/221

(58) Field of Classification Search .................... 707/812
See application file for complete search history.

(56) References Cited

U.S. PATENT DOCUMENTS

| | | | |
|---|---|---|---|
| 2005/0004885 A1* | 1/2005 | Pandian et al. | 707/1 |
| 2010/0128922 A1* | 5/2010 | Navon et al. | 382/100 |
| 2011/0301982 A1* | 12/2011 | Green et al. | 705/3 |
| 2012/0004931 A1* | 1/2012 | Thierman | 705/3 |

* cited by examiner

*Primary Examiner* — Shyue Jiunn Hwa
(74) *Attorney, Agent, or Firm* — Hickman Palermo Truong Becker Bingham Wong LLP; Daniel D. Ledesma

(57) ABSTRACT

Techniques for allowing multiple organizations to register form templates at a central repository are provided. The form templates are then available for other organizations that require filled-out forms to be processed. Each organization registers a different form template with a cloud service. Later, other organizations upload, to the cloud service, scanned versions of filled-out forms. For each uploaded scan data, the cloud service determines which form template best matches the format of the uploaded scan data. The cloud service extracts certain values from the scan data based on the matching form template. The cloud service stores the extracted values in association with the organization that sent the scan data. The cloud service allows other devices to retrieve the extracted values.

17 Claims, 6 Drawing Sheets

FORM PROCESSING CLOUD SERVICE WITH TEMPLATE REPOSITORY

FIELD OF THE INVENTION

The present invention relates to allowing multiple organizations to register form templates with a cloud service, processing filled-out forms, and retrieving form data based on organization.

BACKGROUND

Many organizations (such as private companies, government agencies, publicly-traded companies) rely on optical character recognition (OCR) technology to process paper forms, such as invoices, bank statements, time sheets, etc., in order to store information extracted from the forms. In some cases, different organizations use the same form. For example, Company A has customers in Companies B, C, and D. Each of Companies B, C, and D (or, rather, representatives thereof) receive filled-out forms that originated from Company A. However, in order to process the filled-out forms, each of Companies B, C, and D needs to first register one or more form templates (that reflect blank versions of the filled-out forms) with their respective form OCR server. In other words, form templates are not shared by multiple organizations. Such an approach where each organization must register form templates for forms that require OCR processing increases work that needs to be performed and increases the cost of processing since form template registration can be an expensive task.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

Techniques are provided for storing form templates from different organizations and making the form templates available to other organizations. In an embodiment, first scanned document data that represents a first printed form used by a first organization is received over a network. The first scanned document data may be received from a first scanning device that is operated by the first organization. The first scanned document data is analyzed to identify a first plurality of fields reflected in the first printed form and to generate a first form template. The first form template is stored in a form template repository. Second scanned document data that represents a second printed form used by a second organization that is different than first organization is received. The second scanned document data is analyzed to identify a second plurality of fields reflected in the second printed form and to generate a second form template that is different than the first form template. The second form template data is stored in the form template repository. Third scanned document data that represents a filled-out form is received. The filled-out form corresponds to a particular template and is used by a third organization that is different than the first and second organizations. It is determined which template, of a plurality of templates that are stored in the form template repository, matches the particular template. The plurality of templates includes the first form template and the second form template. In response to determining that the first form template matches the particular template, a plurality of values reflected in the filled-out form are caused to be extracted from the third scanned document data based on the first form template. The plurality of values are caused to be stored in an extracted form database and to be stored in association with the third organization.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. FORM PROCESSING ARCHITECTURE
 A. SCANNING DEVICES
 B. CLOUD
 C. CLIENTS
III. FORM REGISTRATION
IV. FORM PROCESSING
V. FORM DATA RETRIEVAL
VI. IMPLEMENTATION MECHANISMS

I. Overview

An approach is provided for receiving, at a cloud service, form templates from multiple organizations, analyzing the form templates to generate form template data, and storing the form template data in a template repository. Subsequently, a scanning device from any organization, whether or not an organization that submitted a form template, may send scanned document data to the cloud service (or a related cloud service). The cloud service determines, based on the scanned document data, which template to select from the template repository. A template from the template repository is retrieved and used to extract a plurality of values from the scanned document data. In this way, templates from different organizations (e.g., companies) can be shared by other organizations.

II. Form Processing Architecture

Figure 1:
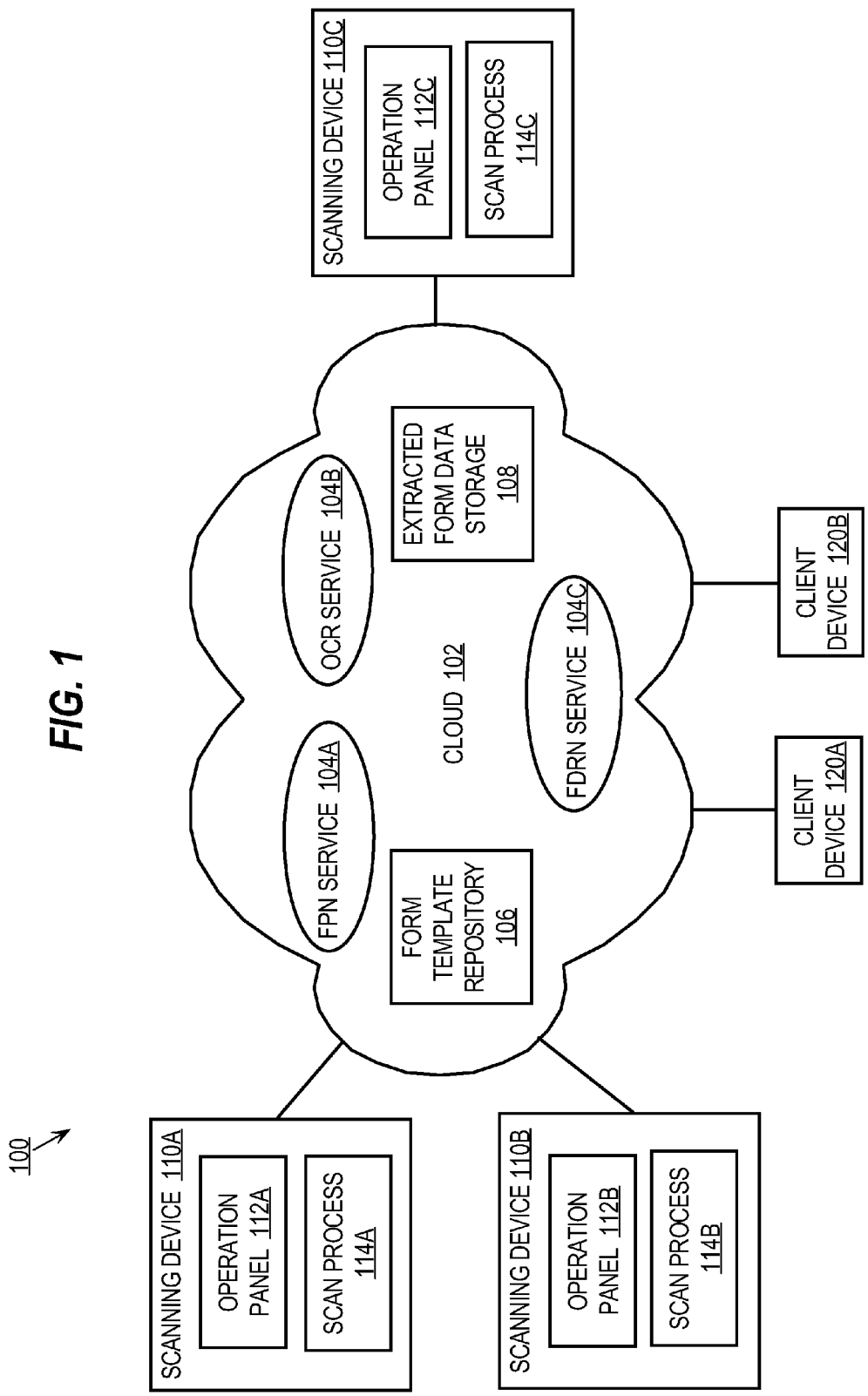
FIG. 1 is a block diagram that depicts an example architecture for processing forms, according to an embodiment of the invention.

FIG. 1 is a block diagram that depicts an example architecture 100 for processing forms, according to an embodiment of the invention. Architecture 100 includes a cloud 102, multiple scanning devices 110A-C, and client devices 120A-B communicatively coupled via a network. The network may be implemented by any medium or mechanism that provides for the exchange of data between the elements of FIG. 1. Examples of a network include, without limitation, a network such as a Local Area Network (LAN), Wide Area Network (WAN), Ethernet or the Internet, or one or more terrestrial, satellite or wireless links.

A. Scanning Devices

Although FIG. 1 depicts only three scanning devices, cloud 102 might support many more scanning devices. Each of scanning devices 110A-C is operated by a different organization, such as a company or governmental entity. Each organization in a set of organizations is different than each other organization in the set. In an embodiment, no organization in the set is a parent organization of another organization in the set and no organization in the set has a parent organization in common with another organization in the set. For example, scanning device 110A is operated by Company A, scanning device 110B is operated by Company B, and scanning device 110C is operated by Company C. None of Companies A, B, or C is a parent company of another of Companies A, B, or C. Furthermore, none of Companies A, B, or C has a parent company in common with another of Companies A, B, or C.

In a related embodiment, although each of scanning devices 110A-C is operated by a different organization, one organization may be affiliated in some way with another organization. For example, scanning device 110A is operated by Company A and scanning device 110B is operated by Company B. Company A may be a parent company of Company B. Alternatively, both Company A and Company B are subsidiaries of another company (e.g., Company D).

Each of scanning devices 110A-C may be manufactured by the same manufacturer or a different manufacturer. For example, Manufacturer A manufactured scanning device 110A, Manufacturer B manufactured scanning device 110B, and Manufacturer C manufactured scanning device 110C.

The company that operates scanning device 110A may not own scanning device 110A. Instead, for example, Company A might lease scanning device 110A from Manufacturer A.

For purposes of brevity, the following description of scanning device 110A is also applicable to scanning device 110B and scanning device 110C.

Scanning device 110A is a device that includes the capability to scan one or more printed documents and generate scanned document data that represents the one or more printed documents. The scanned document data may be in a variety of formats, depending upon a particular implementation. One example format is the portable document format (PDF) by Adobe Systems, Inc. Scanning device 110A may also include a capability to convert scanned document data from a non-text format, such as PDF, to a text-based format, using for example, optical character recognition (OCR). Scanning device 110A may also include the capability to transmit the scanned document data to another location or device, for example, to a computer connected to the scanning device 110A or over a network to a network device. Examples of scanning device 110A include, without limitation, a scanner and a multi-function peripheral that includes one or more functions in addition to scanning, such as printing, copying, faxing, etc.

Scanning device 110A includes an operation panel 112A a scan process 114A. The operation panel 112A is configured to display information to a user and to accept user input. The particular implementation of the operation panel 112A may vary depending upon a particular implementation. For example, the operation panel 112A may include a screen on which a graphical user interface (GUI) is displayed. In addition, the screen may be a touch screen that allows a user to select icons and GUI objects on the GUI. The GUI may be updated to reflect changes in the functionality offered by the scanning device 110A. The operation panel 112A may also include control buttons and a numeric keypad for receiving user input.

Scan process 114A is configured to cause one or more printed documents to be scanned by scanning device 110A and generate scanned document data that represents the one or more printed documents. Scan process 114A may be initiated, for example, in response to a user selection of a start user control on operation panel 112A.

Although not depicted, scanning device 110A might also include storage, which may be any combination of volatile or non-volatile storage for storing data used by scanning device 110A. For example, the storage may be random access memory (RAM), one or more disks, or any combination of RAM and one or more disks for storing scanned document data. The storage may store an address book or contact data that is used by scanning device 110A, for example, to obtain destination addresses for transmitting scanned document data. Scanning device 110A may include other modules and processes that are not depicted in FIG. 1 for purposes of brevity.

B. Cloud

A "cloud" is a computing system that provides access via the Internet to processing power, storage, software or other computing services, often via a web browser. Thus, cloud 102 is viewed as a collection of services from the perspective of scanning devices 110A-C and client devices 120A-B. At the hardware level (although transparent to scanning devices 110A-C and client devices 120A-B), cloud 102 comprises one or more network devices that host a plurality of services.

A cloud may be maintained by a single individual or organization (e.g., company). However, multiple organizations may share responsibility in maintaining a particular cloud. A network service "outside" of a particular cloud is provided by one or more individuals or organizations that are different than any individual or organization that maintains the particular cloud.

In FIG. 1, cloud 102 includes a form processing network (FPN) service 104A. FPN service 104A processes scanned document data as described in more detail hereinafter. Scanning device 110A (and one or more other scanning devices) communicates with FPN service 104A over a network (e.g., the Internet) using a communication protocol. A non-limiting example of a communication protocol is the Internet Protocol (IP). Each other network service in (or hosted by) a cloud may be associated with a different IP address and/or port number. A non-limiting example of a networking protocol that scanning device 110A uses to transmit scanned document data to FPN service 104A is the Hypertext Transfer Protocol (HTTP). Thus, scanning device 110A may (a) generate a first HTTP message to retrieve a web page provided by FPN service 104A, (b) generate a second HTTP message that includes a Uniform Resource Locator (URL) that is associated with FPN service 104A and scanned document data, and (c) send the second HTTP message to FPN service 104A. Thus, an HTTP request sent from scanning device 110A may have the same URL as an HTTP request sent from scanning device 110B.

Cloud 102 may also include an OCR service 104B for converting scanned document data in non-text format, for example PDF, into text-based format. Alternatively, cloud 102 may rely on a third party OCR service that is hosted outside of cloud 102 to convert scanned document data into a text-based format. Cloud 102 may also include a forwarding service (not shown) for transmitting scanned document data in text format to one or more recipients. OCR service 104B is depicted in FIG. 1 as being separate from FPN service 104A and FPN service 104A for purposes of explanation, but OCR service 104B and a forwarding service may be implemented as being part of FPN service 104A and/or FPN service 104A.

Cloud 102 also includes form template repository 106 and extracted form data storage 108. Form template repository 106 and storage 108 may be implemented as any type of volatile or non-volatile storage for storing data. Form template repository 106 stores scanned document data (a) received by and/or processed by FPN service 104A and/or (b) form template data that indicates information about a particular form template. Form template repository 106 stores information about multiple form templates where at least one form template is provided by a first organization while at least one other form template is provided by a second organization that is different than the first organization.

Extracted form data storage 108 stores, for each filled-out form reflected in scanned document data, a set of values that are extracted by OCR service 104B from the scanned document data. Each value in the set of values is associated with a field name. Extracted form data storage 108 also stores, for each set of values that are extracted from scanned document data, organization data that indicates the organization (or rather a representative thereof) that caused the corresponding filled-out form to be scanned and caused the scanned image to be sent to cloud 102.

Cloud 102 also includes a form data retrieval network (FDRN) service 104C. FDRN service 104C receives, from one or more of client devices 120A-B, requests for extracted form data stored in extracted form data storage 108. FDRN service 104C retrieves certain form data from storage 108 based on the request. FDRN service 104C sends form data to one of client devices 120A-B or to another client device that might be identified in the request.

Alternatively, the functionality of FDRN service 104C is included in FPN service 104A. Therefore, in this scenario, client devices 120A-B would communicate with FPN service 104A.

C. Clients

Although only two client devices (120A-B) are depicted in FIG. 1, embodiments of the invention are not limited to only client devices 120A-B. Instead, architecture 100 may include many more client devices.

Client devices 120A-B may be implemented as any type of client device. Examples of client devices 120A-B include, without limitation, personal or laptop computers, workstations, cellular telephony devices such as cell phones, personal digital assistants (PDAs), etc.

Each of client devices 120A-B requests form data from cloud 102. A request from client device 120A may be an HTTP request that includes a URL that is associated with FDRN service 104C. The process of requesting form data from cloud 102 is described in more detail below.

III. Form Registration

Figure 2:
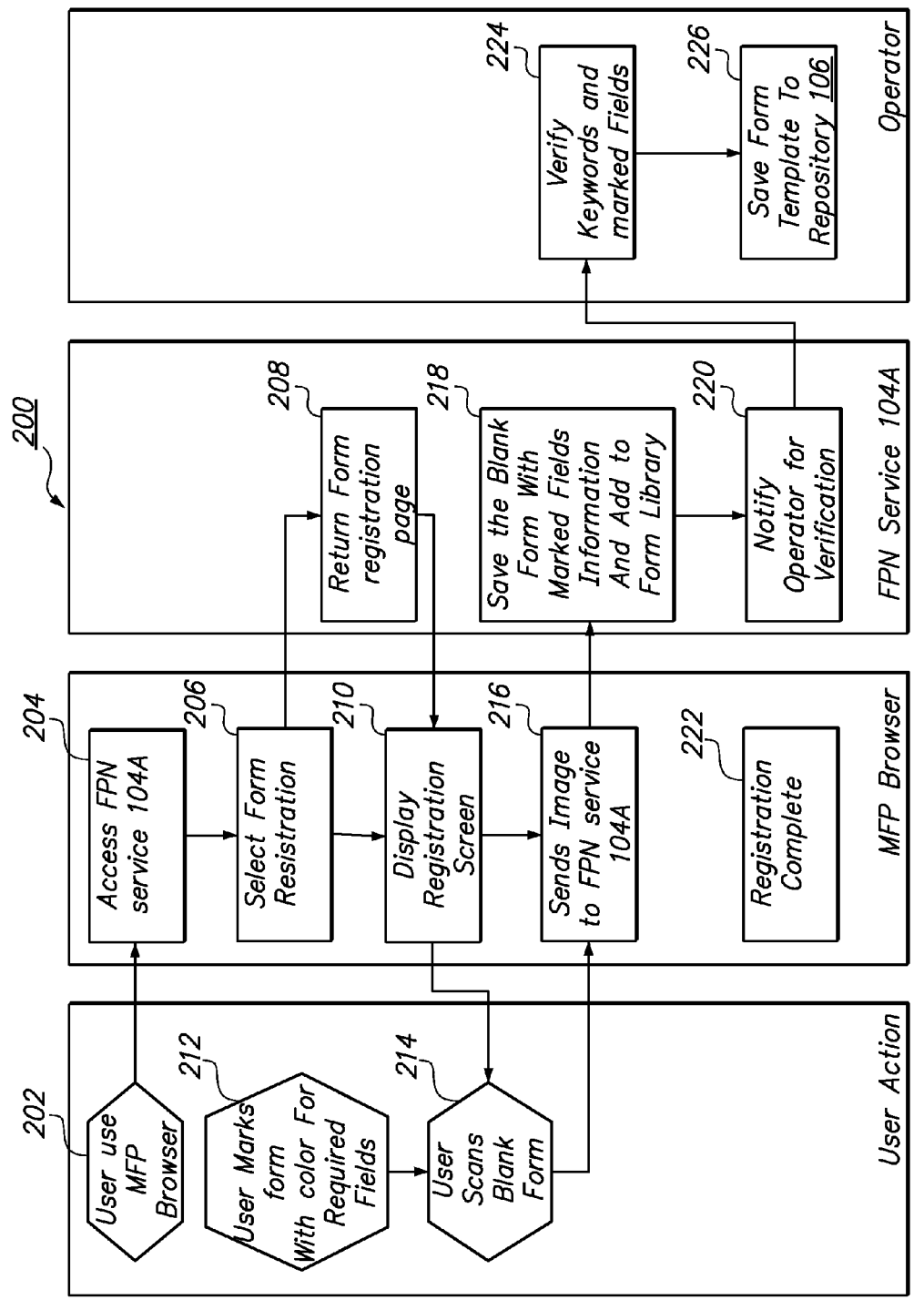
FIG. 2 is a flow diagram that depicts a process for registering a template, according to one embodiment of the invention.

FIG. 2 is a sequence/flow diagram that depicts a process 200 for registering a template, according to one embodiment of the invention. In step 202, a user initiates the execution of a web browser (not depicted in FIG. 1) executing on scanning device 110A.

In step 204, the web browser accesses FPN service 104A.

In step 206, the web browser selects a form registration option and sends an indication of the selection to FPN service 104A.

In step 208, in response to the selection, FPN service 104A sends a form registration page to the web browser.

In step 210, the web browser displays the form registration page on a screen of scanning device 110A.

In step 212, the user marks a printed form with color for all fields on the printed form or only for required fields on the printed form. The printed form may be a blank form or a filled-out form. A blank form is a form that conforms to a template, but that does not have any values filled in (or entered) for any fields of the form. A filled-out form is a form that has a value entered for at least one of the fields of the form. Non-limiting examples of a value include a last name (that comprises multiple characters), an age, a dollar amount, an address, a phone number, or an email address. The printed form may consist of one or more printed papers.

Figure 3:
FIG. 3 is a diagram that depicts an example printed form.

FIG. 3 is a diagram that depicts an example printed form 300 that includes multiple field names 301-309 and field value areas 351-359. Field value areas 351-359 are designated areas on printed form 300 in which an individual is to fill in values, respectively, for field names 301-309. For example, field value area 351 is the area in which an applicant is to enter his/her first name while field value area 356 is the area in which a bank representative is to indicate whether security is approved.

A printed form is a printed document that might consist of one or more papers. In this example, printed form 300 is a single blank form. However, a printed form may be "filled in" in that one or more field value areas that correspond to the field names may be filled in, for example, by a human user, by a typewriter, or by a printer. For example, field value area 351 may have a first name indicated in that area.

In this example, field names 301-309 are highlighted with a pink marker (or highlighter) and field value areas 351-359 are highlighted with a yellow marker (or highlighter). Highlighting is used to assist FPN service 104A in recognizing the important (or "key") fields of a printed form and for determining where the values that correspond to the fields will be found in a scanned version of an actual filled-out form that has not yet been processed.

Instead of color, another form of "marking" may be used to designate field names and corresponding value areas. For example, a user may handwrite and circle a certain number, letter, or character adjacent to certain field names and corresponding value areas that need to be recognized by FPN service 104A.

Step 212 is optional and, if performed, may occur any time prior to step 214, even prior to step 202.

In step 214, the user causes scanning device 110A to scan the printed form and generate scanned document data based on the scan operation. For example, the user places, into a feeder of scanning device 110A, the one or more printed papers of the printed form and selects a scan user interface control to initiate the scan operation.

In step 216, the web browser transmits the scanned document data to FPN service 104A. For example, the web browser may transmit, via the IP protocol, the scanned document data to a particular port on a server that hosts FPN service 104A. The scanned document data may be part of an HTTP post message that includes a URL that is associated with FPN service 104A.

In step 218, FPN service 104A (a) processes the scanned document data to determine (1) the field names (or at least some of the field names) reflected on the printed form and (2) layout information that indicates where one or more field names are located relative to each other on the printed form and/or where one or more value fields are located relative to each other on the printed form. The set of field names and layout information that FPN service 104A determines is referred to herein as "form template data." As part of step 218, FPN service 104A saves the form template data in form template repository 106.

Alternatively, instead of making the form template data available to other parties or organizations, FPN service 104A saves the scanned document data to a form library (not depicted in FIG. 1). In that case, the process proceeds to step 220.

In step 220, FPN service 104A notifies a human operator (e.g., via email or other means) that a form template has been added to the firm library. FPN service 104A may also involve sending, to the web browser, a complete message that indicates that the form registration process is complete. In step 222, the web browser receives the complete message and causes a web page to be displayed, where the web page also indicates that the form registration process is complete.

It step 224, the operator verifies whether the keywords and marked fields reflected in the form template data accurately reflects the printed form reflected in the scanned document data that was transmitted from the web browser in step 216. If the form template data is accurate, then, at step 226, the operator causes the form template data to be stored in form template repository 106, thus making that template available to other parties when those parties upload, to cloud 102, scanned versions of filled-out forms that conform to one or more of the form templates reflected in form template repository 106.

In an embodiment, some (or all) of the steps in process 200 are performed again but relative to another scanning device (e.g., scanning device 110B) and another printed form. In this way, form template repository 106 stores form template data from different organizations. For example, each of Company A and Company B causes different form template data to be stored in form template repository 106. Later, other companies can rely on the form templates reflected in form template repository 106. For example, scanning devices from Company C and Company D can upload scanned versions of filled-out forms that conform to a particular template that originated from Company A. Because Company A already has registered the particular template through FPN service 104A, neither Company C nor Company D is required to register the particular template (which registration entails scanning a blank form of the form template and sending the scanned data to FPN service 104). Thus, not only do Companies C and D avoid the steps required to register the particular template, Companies C and D also avoid any cost of registering the particular template.

IV. Form Processing

Figure 4:
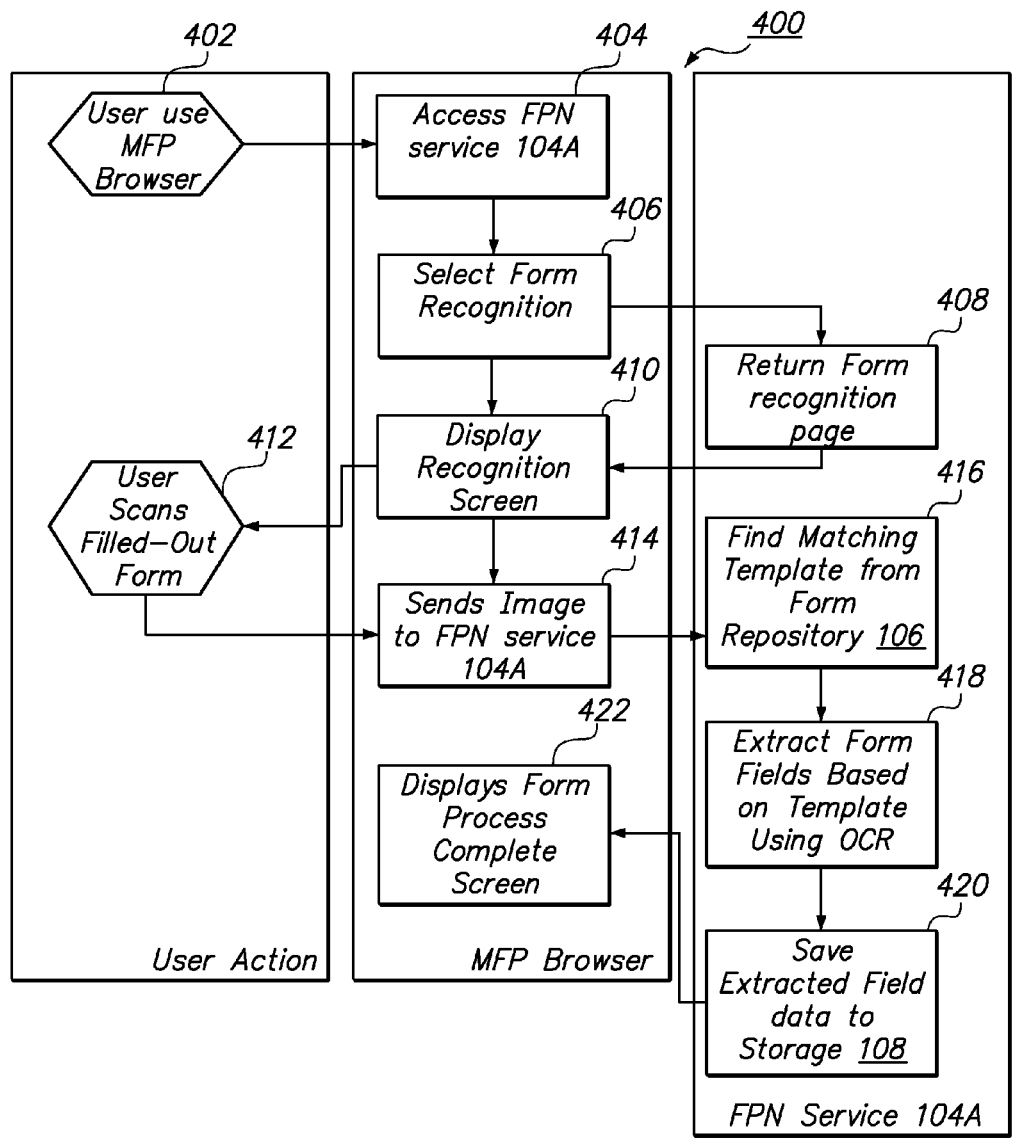
FIG. 4 is a flow diagram that depicts a process for processing scanned document data that reflects a filled-out form, according to one embodiment of the invention.

FIG. 4 is a sequence/flow diagram that depicts a process 400 for processing scanned document data that reflects a filled-out form, according to one embodiment of the invention. In step 402, a user initiates the execution of a web browser (not depicted in FIG. 1) executing on scanning device 110C (i.e., that is different than scanning device 110A referenced above in relation to FIG. 2).

In step 404, the web browser accesses FPN service 104A.

In step 406, the web browser selects a form recognition option (as opposed to a form registration option, as in step 206 in FIG. 2). The web browser sends an indication of the selection to FPN service 104A.

In step 408, in response to the selection, FPN service 104A sends a form recognition page to the web browser (as opposed to a form registration page, as in step 208 in FIG. 2).

In step 410, the web browser displays the form recognition page on a screen of scanning device 110B.

In step 412, the user causes scanning device 110B to scan a filled-out form and generate scanned document data based on the scan. For example, the user places, into a feeder of scanning device 110C, the filled-out form (which consists of one or more printed papers) and selects a scan user interface control to initiate scanning.

In step 414, the web browser transmits the scanned document data to FPN service 104A. For example, the web browser may transmit, via the IP protocol, an HTTP message that includes the scanned document data and a URL associated with FPN service 104A.

In step 416, FPN service 104A identifies a particular template, reflected in form template data stored in form template repository 106, that best matches the form reflected in the scanned document data transmitted in step 414. As noted previously, form template repository 106 stores multiple sets of form template data, where each set of form template data corresponds to a different template. Also, at least two templates that have corresponding form template data stored in form template repository 106 originate from different scanning devices that are operated by different organizations. Thus, the two templates originate from different organizations.

Step 416 may involve identifying a set of keywords reflected in the scanned document data and comparing the set of keywords to keywords associated with one or more templates reflected in form template repository 106. For example, the set of keywords are compared (1) with keywords associated with form template A (originating, e.g., from Company A) and (2) with keywords associated with form template B (originating, e.g., from Company B). It is not necessary that the set of keywords identified in the scanned document data exactly match the keywords associated with the "best matching" form template.

Additionally or alternatively, step 416 involves identifying a layout of the scanned document data (transmitted in step 414) and comparing that layout with the layouts associated with one or more templates reflected in form template repository 106. For example, the layout is compared (1) with layout information associated with form template A and (2) with layout information associated with form template B. Similarly, it is not necessary that the layout of the scanned document data exactly match the layout of the "best matching" form template.

In step 418, once the particular template is identified and the associated form template data is retrieved, OCR service 104B uses the form template data to extract certain values from the scanned document data transmitted in step 412.

In step 420, FPN service 104A (or another process) stores the extracted values in extracted form data storage 108, at least temporarily. The extracted values might not be transmitted to the scanning device that sent the scanned document data (i.e., scanning device 110C in this example), because most scanning devices are not configured to process such data.

As part of step 420, FPN service 104A stores the extracted values in association with organization data that identifies the organization that operates scanning device 110C. The organization data is used as a measure of security to ensure that other (non-authorized) organizations do have access to the extracted values. The extracted values stored in extracted form data storage 108 are organized (at least logically if not physically) based on the organization that sent (via a scanning device) scanned versions of filled-out forms that contain the values. An organization sending a scanned version of a filled-out form to FPN service 104A is shorthand for a scanning device that is operated (or owned) by the organization transmitting the scanned version to FPN service 104A.

The organization may be identified in a number of ways. For example, the scan message transmitted from scanning device 110C in step 414 may include an organization identifier that identifies the organization to which scanning device 110C belongs. As another example, the scan message may include other identifying data (e.g., an IP address or MAC address) that FPN service 104A uses to look-up the organization with which scanning device 110C belongs.

Additionally or alternatively to storing the extracted values in extracted form data storage 108, FPN service 104A causes the extracted values to be sent (e.g., via a HTTP message) to a client device that is associated with the organization that is associated with the filled-out form that was scanned in step 412. The client device may be identified in multiple ways. For example, FPN service 104A may access a mapping that maps the client devices to organizations. This mapping may exist prior to FPN service 108 receiving the scanned document data in step 414. As another example, the scan message transmitted in step 414 (or another message) may identify the client device, for example, in a source address field of the message. In this way, FPN service 104 uses that source address as a destination address in a response message.

In step 422, FPN service 104A sends, to the web browser executing on scanning device 110C, a complete message that indicates that the form processing of the scanned document data transmitted in step 414 is complete. The web browser causes the complete message to be displayed by scanning device 110C.

V. Form Data Retrieval

Figure 5:
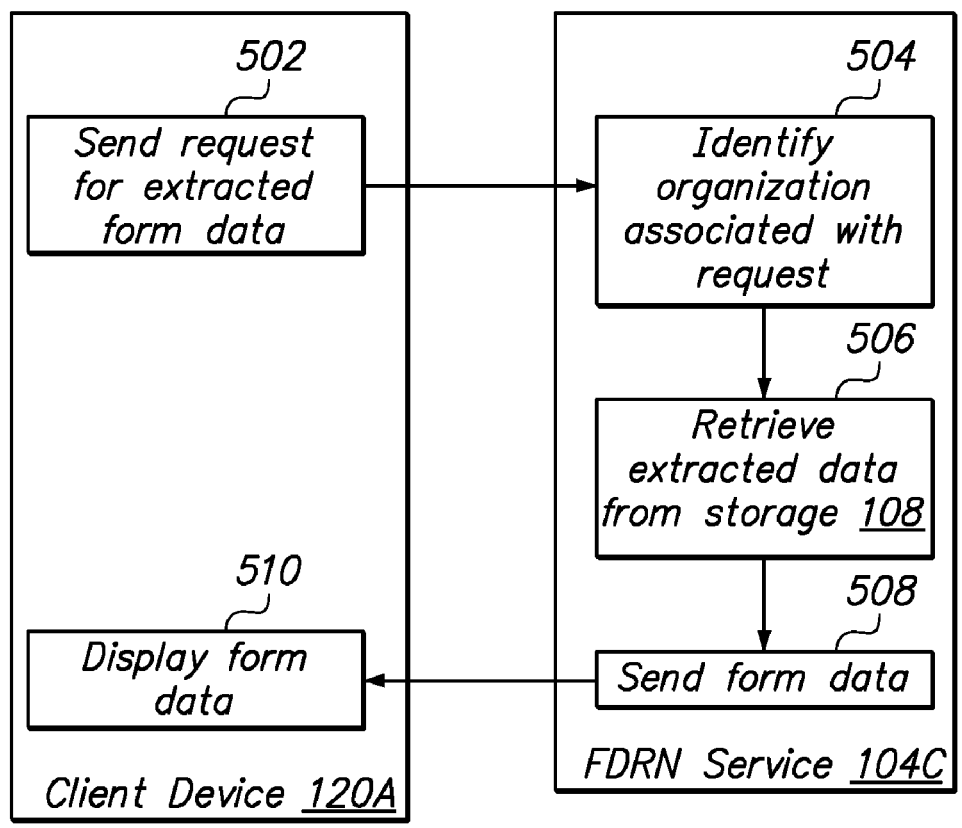
FIG. 5 is a sequence diagram that depicts a process for retrieving extracted values from scanned document data that reflects a filled-out form, according to an embodiment of the invention.

FIG. 5 is a sequence diagram that depicts a process 500 for retrieving extracted values from scanned document data that reflects a filled-out form, according to an embodiment of the invention. In step 502, a user causes a web browser (not depicted in FIG. 1) executing on client device 120A to send, to FDRN service 104C, a request for extracted values. Client device 120A may be associated with an organization that operates a scanning device (e.g., scanning device 110C) that transmitted a scanned version of a filled-out form during a process at least similar to process 400. For example, the organization may own client device 120A. Alternatively, the organization may employ an individual that operates client device 120A, whether or not the individual owns client device 120A.

The request sent in step 502 may contain authentication information (e.g., a username and password) that is used to authenticate the user or organization with which the user is a member. Additionally or alternatively, the request may contain organization data that identifies, to FDRN service 104C, to which organization client device 120A (or the user of client device 120A) belongs. For example, the request may be an HTTP request with a URL that includes an organization identifier.

In step 504, FDRN service 104C determines, based on the request, which organization is associated with the request. For example, the organization may be the organization that operates scanning device 110C (referenced above in relation to process 400) that caused values extracted from a filled-out form to be stored in extracted form data storage 108.

If the request sent in step 502 includes an organization identifier, then FDRN service 104C can retrieve, from storage 108, extracted form data that is associated with the organization identifier. If the request includes authentication data, then FDRN service 104C (or another process) determines whether the authentication data is known to FDRN service 104C. If so, then the authentication data is associated with a particular organization. Each organization may be associated with one set or multiple sets of authentication data. For example, multiple users from Company C may be associated with the same authentication data or with different authentication data, yet are still authorized to access the same extracted form data from storage 108. In this example, it is presumed that the request is associated with an organization that FDRN service 104C recognizes.

In step 506, FDRN service 104C retrieves, from extracted form data storage 108, form data that is associated with the organization identified in step 506. The request sent in step 504 may be for all form data that is associated with the identified organization. Alternatively, the request may be for all form data that is associated with the identified organization and that has yet to be retrieved by the organization (or a representative of the organization). Thus, the form data stored in extracted form data storage 108 may be associated with a retrieval status data that indicates whether the associated form data has already been retrieved by the organization (or a representative thereof). Whenever FDRN service 104C retrieves a set of extracted form data from storage 108, FDRN service 104C causes the retrieval status of that set of extracted form data to be updated to reflect that the set of extract form data has been retrieved. Alternatively, the request may be for form data (associated with the organization) that is from the most-recently scanned filled-out form. Thus, each set of extracted form data may be associated with a timestamp that indicates when, relative to other extracted form data that is stored in storage 108 and that is associated with the same organization, the set of extracted form data was first stored in storage 108.

In step 508, FDRN service 104C sends the retrieved form data to the web browser executing on client device 120A. The retrieved form data may be part of a web page generated by FDRN service 104C.

In step 510, the web browser displays the retrieved form data and/or causes the form data to be stored in persistent storage, whether local to client device 120A or remote to client device 120A.

VI. Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
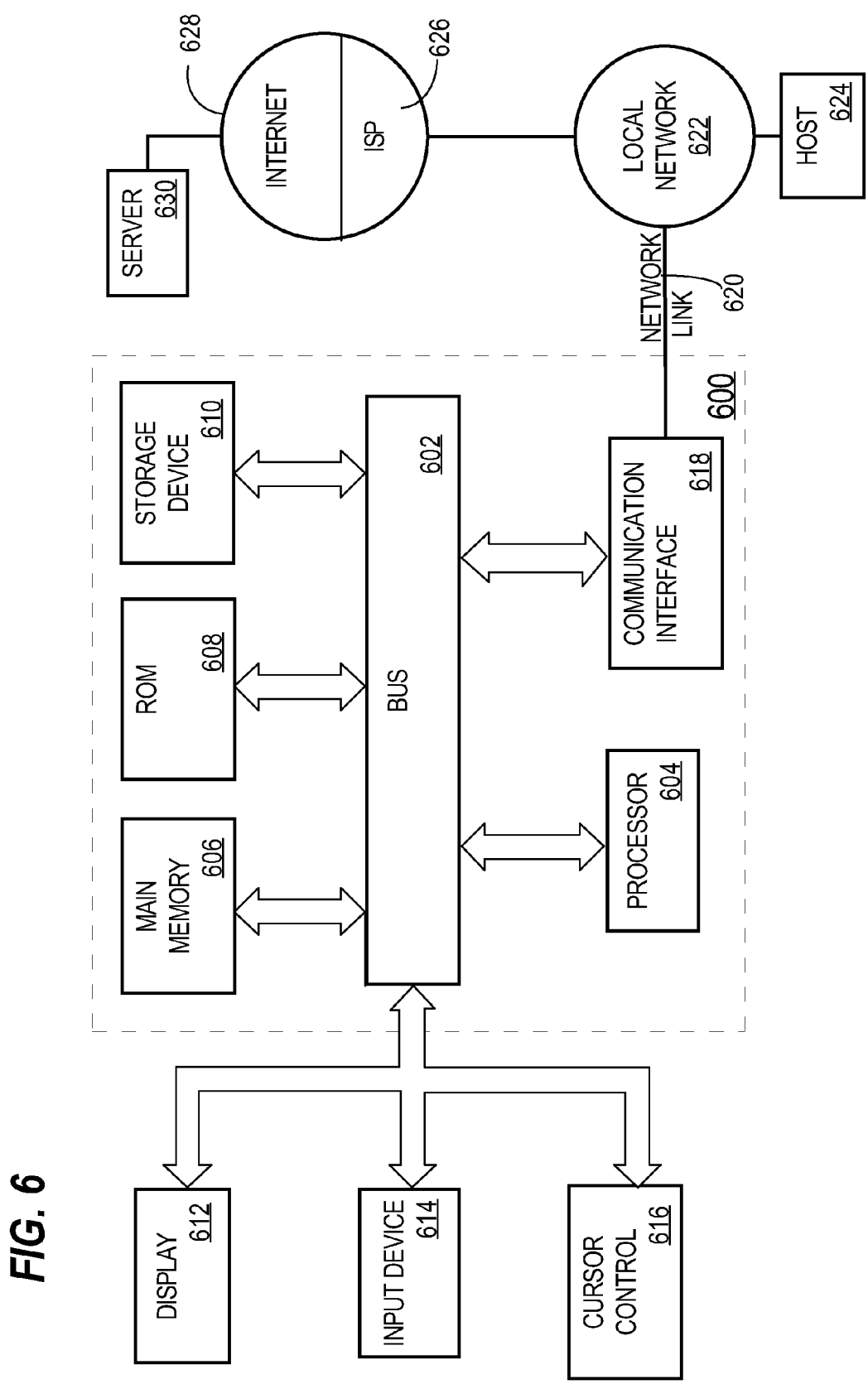
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions for processing scanned document data, wherein the instruction, when executed by one or more processors, cause:

receiving, over a network, first scanned document data that represents a first printed form used by a first organization;

analyzing the first scanned document data to identify a first plurality of fields reflected in the first printed form and to generate a first form template;

storing the first form template in a form template repository;

receiving second scanned document data that represents a second printed form used by a second organization that is different than the first organization;

analyzing the second scanned document data to identify a second plurality of fields reflected in the second printed form and to generate a second form template that is different than the first form template;

storing the second form template in the form template repository;

receiving third scanned document data that represents a filled-out form and that has a value entered for at least one field of the filled-out form, that corresponds to a particular template, and that is used by a third organization that is different than the first and second organizations;

determining which template, of a plurality of templates that are stored in the form template repository, matches the particular template, wherein the plurality of templates includes the first form template and the second form template;

in response to determining that the first form template matches the particular template, causing a plurality of values reflected in the filled-out form to be extracted from the third scanned document data based on the first form template;

causing the plurality of values to be stored in an extracted form database and to be stored in association with the third organization;

receiving fourth scanned document data that represents a second filled-out form that corresponds to a second particular template and that is used by a fourth organization that is different than the third organization;

determining which template, of the plurality of templates that are stored in the form template repository, matches the second particular template, wherein the plurality of templates includes the first form template and the second form template;

in response to determining that the first form template matches the second particular template, causing a second plurality of values reflected in the second filled-out form to be extracted from the fourth scanned document data based on the first form template; and causing the second plurality of values to be stored in the extracted form database and to be stored in association with the fourth organization.

2. The one or more machine-readable media of claim 1, wherein the steps of receiving, analyzing, and storing are performed by a form document processing network service that is accessible via the Internet Protocol.

3. The one or more machine-readable media of claim 2, wherein:
the first scanned document data is received in association with a first Hypertext Transfer Protocol (HTTP) message that includes a Uniform Resource Location (URL) that is associated with the form document processing network service; and
the second scanned document data is received in association with a second HTTP message that includes the URL.

4. The one or more machine-readable media of claim 1, wherein the
instructions, when executed by one or more processors, further cause:
receiving, from a first device that is operated by the third organization, a request for extracted data;
determining, based on data in the request, that the request is associated with the third organization;
in response to determining that the request is associated with the third organization, retrieving the plurality of values from the extracted form database and sending the plurality of values to the first device.

5. The one or more machine-readable media of claim 1, wherein:
the first printed form includes a first type of marker for names of fields identified on the first printed form;
the first printed form includes a second type of marker for areas that are designated for entering values of the fields identified on the first printed form; and
the second type of marker is different than the first type of marker.

6. The one or more machine-readable media of claim 1, wherein:
the first scanned document data is received from a first scanning device that is operated by the first organization;
the second scanned document data is received from a second scanning device that is operated by the second organization; or
the third scanned document data is received from a third scanning device that is operated by the third organization.

7. An apparatus for processing scanned document data, the apparatus comprising:
one or more processors;
one or more machine-readable media storing instructions which, when executed by the one or more processors, cause:
receiving first scanned document data that represents a first printed form used by a first organization;
analyzing the first scanned document data to identify a first plurality of fields reflected in the first printed form and to generate a first form template;
storing the first form template in a form template repository;
receiving second scanned document data that represents a second printed form used by a second organization that is different than the first organization;
analyzing the second scanned document data to identify a second plurality of fields reflected in the second printed form and to generate a second form template that is different than the first form template;
storing the second form template in the form template repository;
receiving third scanned document data that represents a filled-out form and that has a value entered for at least one field of the filled-out form, that corresponds to a particular template, and that is used by a third organization that is different than the first and second organizations;
determining which template, of a plurality of templates that are stored in the form template repository, matches the particular template, wherein the plurality of templates includes the first form template and the second form template;
in response to determining that the first form template matches the particular template, causing a plurality of values reflected in the filled-out form to be extracted from the third scanned document data based on the first form template;
causing the plurality of values to be stored in an extracted form database and to be stored in association with the third organization;
receiving fourth scanned document data that represents a second filled-out form that corresponds to a second particular template and that is used by a fourth organization that is different than the third organization;
determining which template, of the plurality of templates that are stored in the form template repository, matches the second particular template, wherein the plurality of templates includes the first form template and the second form template;
in response to determining that the first form template matches the second particular template, causing a second plurality of values reflected in the second filled-out form to be extracted from the fourth scanned document data based on the first form template; and
causing the second plurality of values to be stored in the extracted form database and to be stored in association with the fourth organization.

8. The apparatus of claim 7, wherein the steps of receiving, analyzing, and storing are performed by a form document processing network service that is accessible via the Internet Protocol.

9. The apparatus of claim 8, wherein:
the first scanned document data is received in association with a first Hypertext Transfer Protocol (HTTP) message that includes a Uniform Resource Location (URL) that is associated with the form document processing network service; and
the second scanned document data is received in association with a second HTTP message that includes the URL.

10. The apparatus of claim 7, wherein the instructions, when executed by one or more processors, further cause:
receiving, from a first device that is operated by the third organization, a request for extracted data;
determining, based on data in the request, that the request is associated with the third organization; and
in response to determining that the request is associated with the third organization, retrieving the plurality of values from the extracted form database and sending the plurality of values to the first device.

11. The apparatus of claim 7, wherein:
the first printed form includes a first type of marker for names of fields identified on the first printed form;
the first printed form includes a second type of marker for areas that are designated for entering values of the fields identified on the first printed form; and
the second type of marker is different than the first type of marker.

12. The apparatus of claim 7, wherein:
the first scanned document data is received from a first scanning device that is operated by the first organization;
the second scanned document data is received from a second scanning device that is operated by the second organization; or
the third scanned document data is received from a third scanning device that is operated by the third organization.

13. A computer-implemented method for processing scanned document data, the method comprising:
receiving first scanned document data that represents a first printed form used by a first organization;
analyzing the first scanned document data to identify a first plurality of fields reflected in the first printed form and to generate a first form template;
storing the first form template in a form template repository;
receiving second scanned document data that represents a second printed form used by a second organization that is different than the first organization;
analyzing the second scanned document data to identify a second plurality of fields reflected in the second printed form and to generate a second form template that is different than the first form template;
storing the second form template in the form template repository;
receiving third scanned document data that represents a filled-out form and that has a value entered for at least one field of the filled-out form, that corresponds to a particular template, and that is used by a third organization that is different than the first and second organizations;
determining which template, of a plurality of templates that are stored in the form template repository, matches the particular template, wherein the plurality of templates includes the first form template and the second form template;
in response to determining that the first form template matches the particular template, causing a plurality of values reflected in the filled-out form to be extracted from the third scanned document data based on the first form template;
causing the plurality of values to be stored in an extracted form database and to be stored in association with the third organization;
receiving fourth scanned document data that represents a second filled-out form that corresponds to a second particular template and that is used by a fourth organization that is different than the third organization;
determining which template, of the plurality of templates that are stored in the form template repository, matches the second particular template, wherein the plurality of templates includes the first form template and the second form template;
in response to determining that the first form template matches the second particular template, causing a second plurality of values reflected in the second filled-out form to be extracted from the fourth scanned document data based on the first form template; and
causing the second plurality of values to be stored in the extracted form database and to be stored in association with the fourth organization
wherein the method is performed by one or more computing devices.

14. The method of claim 13, wherein the method is performed by a form document processing network service that is accessible via the Internet Protocol.

15. The method of claim 14, wherein:
the first scanned document data is received in association with a first Hypertext Transfer Protocol (HTTP) message that includes a Uniform Resource Location (URL) that is associated with the form document processing network service; and
the second scanned document data is received in association with a second HTTP message that includes the URL.

16. The method of claim 13, further comprising:
receiving, from a first device that is operated by the third organization, a request for extracted data;

determining, based on data in the request, that the request is associated with the third organization;

in response to determining that the request is associated with the third organization, retrieving the plurality of values from the extracted form database and sending the plurality of values to the first device.

17. The method of claim 13, wherein:

the first scanned document data is received from a first scanning device that is operated by the first organization;

the second scanned document data is received from a second scanning device that is operated by the second organization; or the third scanned document data is received from a third scanning device that is operated by the third organization.

* * * * *